US006230017B1

United States Patent
Andersson et al.

(10) Patent No.: US 6,230,017 B1
(45) Date of Patent: May 8, 2001

(54) GEOGRAPHICAL RESTRICTION IN CELLULAR TELECOMMUNICATIONS NETWORK

(75) Inventors: Mikael Andersson; Nils Peter Östrup; Kjell Anders Westroos, all of Linköping (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/916,285

(22) Filed: Aug. 22, 1997

Related U.S. Application Data (60) Provisional application No. 60/054,500, filed on Jul. 31, 1997.

(51) Int. Cl.[7] .................................................. H04Q 7/20
(52) U.S. Cl. ...................... 455/456; 455/433; 455/435; 455/440
(58) Field of Search .......................... 455/63, 422, 457, 455/456, 509, 517, 520, 524, 440, 435, 436, 433

(56) References Cited

U.S. PATENT DOCUMENTS

| | | | |
|---|---|---|---|
| 5,214,789 | * 5/1993 | George | 455/440 |
| 5,235,633 | * 8/1993 | Dennison et al. | 455/456 |
| 5,313,653 | * 5/1994 | Sasuta | 455/17 |
| 5,442,805 | * 8/1995 | Sagers et al. | 455/456 |
| 5,594,947 | * 1/1997 | Grube et al. | 455/509 |
| 5,600,706 | * 2/1997 | Dunn et al. | 455/456 |
| 5,613,205 | * 3/1997 | Dufour | 455/440 |
| 5,778,304 | * 7/1998 | Grube et al. | 455/422 |
| 5,794,149 | * 8/1998 | Hoo | 455/438 |
| 5,802,468 | * 9/1998 | Gallant et al. | 455/422 |
| 5,815,808 | * 9/1998 | Valentine | 455/422 |
| 5,850,604 | * 12/1998 | Dufour et al. | 455/435 |
| 5,995,823 | * 11/1999 | Stephens | 455/410 |
| 6,011,973 | * 1/2000 | Valentine et al. | 455/456 |

FOREIGN PATENT DOCUMENTS

| | | | |
|---|---|---|---|
| 0505106 | * 9/1992 | (EP) . | |
| 0 788 287 A2 | 8/1997 | (EP) . | |
| 93/03585 | 2/1993 | (WO) . | |
| WO 96/34500 | 10/1996 | (WO) . | |
| WO 97/03531 | 1/1997 | (WO) . | |
| WO 97/07641 | 2/1997 | (WO) . | |
| WO 97/13387 | 4/1997 | (WO) . | |
| WO 98/25433 | * 6/1998 | (WO) | H04Q/7/38 |
| 98/30056 | 7/1998 | (WO) . | |

* cited by examiner

Primary Examiner—Vivian Chang
Assistant Examiner—Charles N. Appiah
(74) Attorney, Agent, or Firm—Nixon & Vanderhye P.C.

(57) ABSTRACT

In a cellular telecommunications network, geographical restriction is stored for a mobile subscriber in the subscriber's record (100A, 100B, 100C, 100D) in a database at a node of the network, preferably at a home location register [HLR] (24). In accordance with one mode of the invention, the mobile station is permitted to operate only in cells identified in the subscriber's record in the HLR. In accordance with this mode, only applicable cells listed in the subscriber's record are paged when a call is direct to the mobile station, and the mobile station can only originate calls and sustain calls from such cells. In a variation of this mode, calls originated by the mobile station in the applicable cells listed in the subscriber's record can be sustained when the mobile station travels into non-applicable cells. In accordance with another mode known as "soft" restriction, a first (e.g., reduced) tariff is applied to calls originated and received in cells listed in a geographical restriction field of the subscriber's record in the home location register, with calls to and from other cells being permitted at a second (e.g., standard) tariff.

19 Claims, 8 Drawing Sheets

GEOGRAPHICAL RESTRICTION IN CELLULAR TELECOMMUNICATIONS NETWORK

This application claims the benefit of United States provisional patent application Serial No. 60/054,500 filed Jul. 31, 1997, entitled "GEOGRAPHICAL RESTRICTION IN CELLULAR TELECOMMUNICATIONS NETWORK", which is incorporated herein by reference.

BACKGROUND

1. Field of Invention

This invention pertains to the field of telecommunications, and particularly to telecommunications involving mobile stations operating in context of a cellular mobile telecommunications system.

2. Related Art and Other Considerations

In mobile telecommunications, mobile stations such as mobile telephones communicate over radio channels with base stations. Typically a plurality of base stations are, in turn, connected to a mobile switching center. The mobile switching center is usually connected, e.g., via a gateway, to other telecommunication networks, such as the public switched telephone network.

Traditionally the radio transmissions of each base station cover a geographical area, e.g., one or more "cells". A predetermined number of cells typically form a location area. When an active mobile station travels from an old cell to a new cell, a handoff or handover must occur from the base station handling the old cell to the base station handling the new cell. A mobile station in an idle mode can move or "roam" from an old cell to a new cell, and even change location areas.

In a telecommunications network, certain information concerning a mobile station is stored in a home location register (HLR). As the mobile station travels into a location area that is handled by a different mobile switching center, a location update operation must occur so that both the home location register (HLR) and a visitor location register (VLR), typically at the mobile switching center, have appropriate current information about the mobile station and its whereabouts. In this regard, when a mobile station travels into an area having a different location identifier, a forced registration typically occurs. In the forced registration, the home location register (HLR) is updated regarding the particular mobile switching center now serving the mobile station.

When a call is placed to a mobile station, the cellular network "pages" the mobile station in certain cells, e.g., location area, based on stored information indicative, e.g., of where the mobile station has roamed or is currently located. The paging signals are sent from the mobile switching center to concerned base stations which handle the certain cells.

Operators of mobile telecommunications systems, e.g., telecommunications providers or telecommunications companies, typically have subscription agreements to the mobile subscribers. Generally the subscription agreements assess differing fees or tariffs depending on such circumstances as number of calls, time of call, distance covered by call (e.g., long distance), etc.

Operators of cellular-based telecommunications networks have an opportunity to increase revenue when subscribers are encouraged to increase utilization of the mobile stations. To this end, in areas with low traffic density there may be spare capacity that could be offered to subscribers. The spare capacity can be offered to subscribers at a lower tariff but subject to restrictions which are not applicable to regular tariff calls. One example of such a restriction is a geographical restriction, i.e., restricting the mobile subscriber to use the mobile station only in specified cells.

EP 641137 discloses a memory card (e.g., SIM) situated within a mobile station, the SIM card having a stored local area identification. Access to a network is only permitted when the stored local area identification agrees with a broadcast local area identifier, thereby restricting the user's access to the mobile network to a defined local area. Provision therefore must be made at the mobile station for permission to complete a call or allow a call to originate from the mobile station, thereby increasing the complexity of the mobile station. Moreover, changing the restricting local area identification necessities preparation and delivery of a new SIM card. Further, SIM cards are not universally available.

What is needed therefore, and an object of the present invention, is a flexible and convenient technique for geographically restricting operation of a mobile station in a cellular telecommunications network.

SUMMARY

In a cellular telecommunications network, geographical restriction information is stored for a mobile subscriber in the subscriber's record in a database at a node of the network, preferably in the home location register. In accordance with one mode of the invention, the mobile station is permitted to operate only in cells identified in the subscriber's record in the HLR. In accordance with this mode, only applicable cells listed in the subscriber's record are paged when a call is directed to the mobile station, and the mobile station can only originate calls and sustain calls from such cells. In a variation of this mode, calls originated and terminated by the mobile station calls in the applicable cells listed in the subscriber's record can be sustained when the mobile station travels into non-applicable cells.

In accordance with another mode known as "soft" restriction, a first (e.g., reduced) tariff is applied to calls originated and received in cells listed in a geographical restriction field of the subscriber's record in the home location register, with calls to and from other cells being permitted at a second (e.g., standard) tariff.

When the mobile station travels into an allowed cell of new location area, the geographical restriction information for the mobile subscriber is transmitted to the VLR. Using the geographical restriction information for the mobile subscriber stored at the VLR, the mobile switching center currently handling the mobile station determines whether calls can be completed and processed. Roaming attempts outside the area of geographical restriction are permitted so that whereabouts of the mobile station can be monitored and maintained. However, except for soft restrictions, attempts to originate calls outside the area of geographical restriction are rejected.

The information for geographically restricting operation of the mobile station is flexibly configured to include a plurality of geographical restriction criteria. In one embodiment, the information for geographically restricting operation includes a first list of cells and a second list of cells. The first list is utilized for determining in what cells the mobile station can operate (be paged and originate calls) during a first time period, while the second list is utilized for determining in what cells the mobile station can operate during a second time period.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1A:
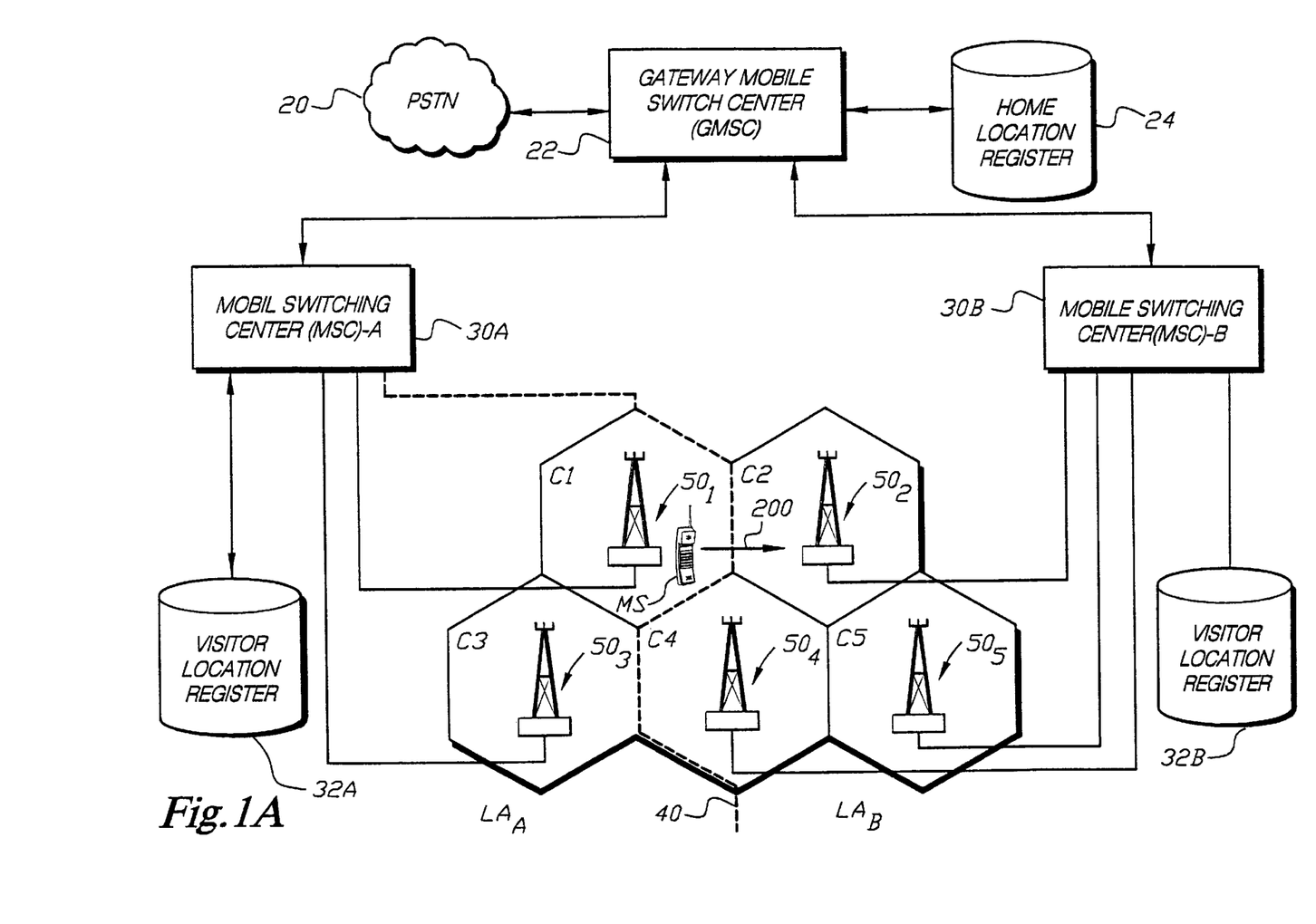
FIG. 1A is a diagrammatic view of a cellular mobile telecommunications system showing geographical restriction imposed in accordance with a first embodiment of the invention.

FIG. 1A shows a telecommunications system wherein an embodiment of the present invention is implemented. In particular, FIG. 1A shows public switched telephone network 20 connected to a gateway mobile switching center (GMSC) 22 for facilitating telephonic access to mobile subscribers utilizing mobile stations in a cellular mobile telecommunications system. Gateway mobile switching center (GMSC) 22 is connected to home location register (HLR) 24 and preferably by terrestrial lines to a plurality of mobile switching centers (MSCs), such as mobile switching center 30A and mobile switching center 30B. Each mobile switching center 30 has access to (e.g., is connected to) an associated visitor location register (VLR) 30, VLRs 32A and 32B being shown in FIG. 1A.

The mobile aspects of the telecommunications system of FIG. 1A serve a plurality of location areas (LAs), of which for simplification only location areas $LA_A$ and $LA_B$ are shown (location areas $LA_A$ and $LA_B$ being separated by broken line 40 in FIG. 1A). Within location areas $LA_A$ and $LA_B$ a plurality of cells are established with reference to base stations (BSs) situated therein. As illustrated, base station $50_1$ serves cell C1; base station $50_2$ serves cell C2, and so forth. As it so happens in FIG. 1A, cells C1 and C3 are included in location area $LA_A$ while cells C2, C4 and C5 are included in location area $LA_B$.

A cell is a basic unit of a cellular system and is the geographic area where radio coverage is provided by one base station. Different cells are identified by a unique number call Cell Global Identity (CGI). For sake of discussion of the embodiments herein, the numbering C1, C2, . . . C5 serves as the unique cell numbering for the Cell Global Identity. While the cells in the illustrations are represented as hexagonal, it should be understood by those skilled in the art that cells of other shapes and configurations can instead be utilized.

Base stations 50 communicate with mobile stations (e.g., mobile telephones) using radio channels. Each base station includes both transmitter(s)/receiver(s) (depicted by the antenna shown in FIG. 1A) and a base station controller (depicted by the box beneath the antenna).

Each base station 50 is connected to one mobile switching center (MSC) 30. Typically, each mobile switching center (MSC) 30 is connected to and serves a plurality of base stations. The mobile switching center (MSC) 30 is responsible for switching functions related to call processing for calls originated from and destined to a mobile station. Each mobile switching center (MSC) 30 interfaces with base stations 50 which its serves, as well as interfacing with other switching stations. In particular, each mobile switching center (MSC) 30 connects to non-mobile switching centers through the gateway mobile switching center (GMSC) 22.

Location Areas (LAs) are groups of cells. Each location area has a separate Location Area Identity (LAI). The base stations within a location area periodically broadcast the LAI for the particular location area in which they are situated.

Home Location Register (HLR) 24 is a data base used to store and manage subscription information for mobile subscribers belonging to a specific telecommunications operator. A telephone company or telephone service provider is an example of what is meant by "telecommunications operator". Typically, an HLR stores data about subscribers, including subscriber's MSITDN, IMSI, supplementary services, location information, and authentication parameters. As is subsequently described, an important feature of the present invention is that the HLR additionally has stored therein restriction information for limiting the subscriber's use of the mobile station to a specified geographical area (e.g., the service is restricted to one or more allowed cells).

Each visitor location register (VLR) 32 is a database which contains information about mobile stations current location in the geographical area serviced by the associated mobile switching center (MSC) 30. For example, VLR 32A includes information for mobile stations currently serviced by mobile switching station 30A, which includes mobile stations in cells C1 and C3. For each mobile station, VLR 32 contains temporary subscriber information, including a mobile station roaming number (MSRN), which is needed by the associated MSC 30 to provide service for visiting subscribers.

In FIG. 1A, according to the present invention mobile station MS is restricted so that call origination and call receipt can occur only while mobile station MS is situated in cell C1 and cell C2. Restriction of call origination and call receipt in FIG. 1A is denoted by cells C1 and C2 being horizontally hatched. It may be, for example, that the subscriber for mobile station MS lives in cell C1 and works in cell C2, and is willing to enter a subscription agreement in which use of mobile station MS is restricted only to cells C1 and C2 in exchange for a tariff which is lower than what would otherwise be assessed.

Figure 2A:
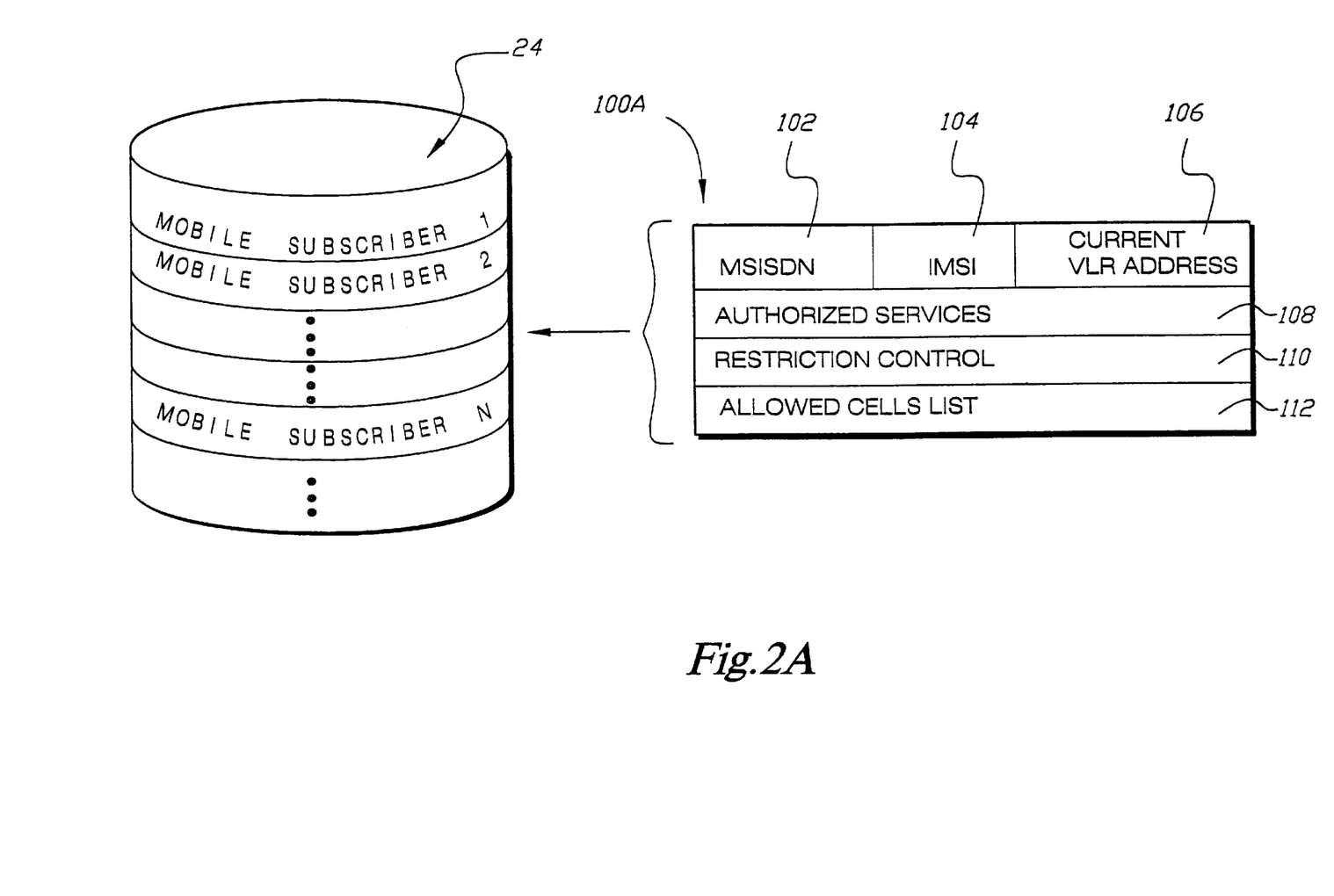
FIG. 2A is a diagrammatic view of a home location register showing contents of a record for a restricted mobile subscriber for the embodiment of FIG. 1A.

FIG. 2A shows home location register (HLR) 24 as including records for a plurality of mobile subscribers, including a record 100A for the mobile subscriber (mobile subscriber "N") having the subscription agreement above discussed with respect to FIG. 1A. HLR record 100A for mobile subscriber N includes the following fields: MSISDN field 102, IMSI field 104, current VLR address field 106, authorized services field 108, restriction control field 110, and allowed cells list 112.

The MSISDN field 102 of record 100A is the mobile station ISDN number, which uniquely identifies a mobile telephone subscription in the public switched telephone network numbering plan. Typically, the MSISDN is a concatenation of a country code, a national destination code or area code, and a subscriber number. The IMSI field 104 of record 100A is the international mobile subscriber identity, which is a unique identity allocated to each subscriber which facilitates correct subscriber identification over the radio path and through the network. The IMSI is usually a concatenation of mobile country code, mobile network code, and mobile station identification number.

The current VLR address field 106 of record 100A contains a network address for the particular visitor location register (VLR) in which the mobile station MS for mobile subscriber N is currently registered. As indicated above, the contents of current VLR address field 106 must be updated as mobile station MS moves from an area handled by one mobile switching center to an area served by another mobile switching center. The authorized services field 108 of record 100A, not particularly pertinent to the present invention, is a list of network services to which mobile subscriber N subscribes.

The restriction control field 110 of record 100A contains a flag which indicates that mobile subscriber N has a subscription agreement which places geographical restrictions upon usage of mobile station MS. In particular, a flag set in restriction control field 110 indicates that mobile subscriber N is to be accorded a low tariff in exchange for mobile subscriber N agreeing to use mobile station MS only in the allowed cells which are stored in the allowed cells list field 112 of record 100A. For the particular embodiment illustrated in FIG. 1A, the allowed cells list field 112 of record 100A contains cell identifiers (e.g., Cell Global Identity [CGI]) for cells C1 and C2.

In use, suppose (as above postulated) that mobile subscriber N lives in cell C1 and works in cell C2, and that at the beginning of the day mobile subscriber N travels from cell C1 to cell C2 as he goes to work, taking mobile station MS with him as indicated by arrow 200 in FIG. 1A. In moving into cell C2, mobile station MS travels into location area LAB which is handled by mobile switching center 30B rather than mobile switching center 30A as formerly. In cell C2, mobile station MS detects the location area identity (LAI) which is continuously transmitted by base station 502 over the air interface. Upon detecting a change in the location area identity (LAI), mobile station MS sends a location update request over the appropriate radio channel to base station 502. The location update request is transmitted to mobile switching center 30B, which in turn sends the location update request (via GMSC 22) to home location register (HLR) 24. Knowing the mobile switching center (mobile switching center 30B) from which the location update request was received, HLR 24 updates the current VLR address field 106 in its record 100A for mobile subscriber N to be the VLR associated with the mobile switching center from which the location update request was received, e.g., VLR 32A. HLR 24 then sends a location update accepted message to mobile switching center 30B, and for mobile station MS transmits to VLR 32A the geographical restrictive information, e.g., information contained in restriction control field 110 and allowed cells list field 112 (see FIG. 2A) for mobile subscriber N. Furthermore, HLR 24 sends a message to VLR 30A to cancel registration of mobile station MS in VLR 30A, which cancellation message is preferably acknowledged by VLR 30A.

Suppose another subscriber, such as a subscriber in PSTN 20, dials the MSISDN of the mobile subscriber N in order to place a call. Upon the call reaching GMSC 22, a message is sent to HLR 24 in order to determine the current whereabouts of mobile station. In conventional fashion, HLR 24 uses current VLR address field 106 to determine the address of the VLR 30B currently serving mobile station MS, and obtains from VLR 30B the mobile station roaming number (MSRN) assigned by VLR 30B for mobile station MS. HLR 24 then advises GMSC 22 of the MSRN for mobile station MS, so that the call can be routed to mobile switching center 30B.

Upon receipt of a call directed to mobile station MS, mobile switching center 30B consults its VLR 32B and obtains therefrom the record for mobile station MS which is registered therein. In particular, as mentioned above, the record in VLR 32B for mobile station MS includes the geographical restrictive information previously transmitted thereto by HLR 24. Since, as illustrated in FIG. 1A, mobile station MS can only operate in cells C1 and C2, and since mobile switching station 30B handles only cell C2, mobile station MS is paged only in cell C2. That is, mobile switching center 30B authorizes paging messages for this call to be transmitted only by base station $50_2$ in cell C2; the other base stations controlled by mobile switching center 30B are not permitted to issue a page for mobile station MS.

Mobile station MS can originate and receive calls so long as mobile station MS remains in cell C2 (or returns to allowed cell C1). For example, if the mobile subscriber utilizing mobile station MS were to desire to place a call, upon receipt of a message from mobile station MS indicative of such desire, mobile switching station 30B checks the record in VLR 32B to ensure that mobile station MS is in an allowed cell. Since in the situation depicted in FIG. 1A the mobile station MS is allowed to operate in cell C2, the message requesting placement of a cell is processed normally.

In accordance with a "hard" restriction embodiment of the invention, should mobile station MS travel into a non-allowed cell such as cell C4 in FIG. 1A, any call in which mobile station MS had been participating is terminated. Mobile station MS is permitted to roam into a non-allowed cell such as cell C4 in order for the system to monitor the whereabouts of mobile station MS. However, in accordance with the hard restriction embodiment of the invention, mobile station MS is essentially non-operational in cell C4. That is, mobile station MS cannot originate a call in cell C4 and, as explained above, cell C4 will not be paged should a call be directed to mobile station MS in cell C4.

Figure 1B:
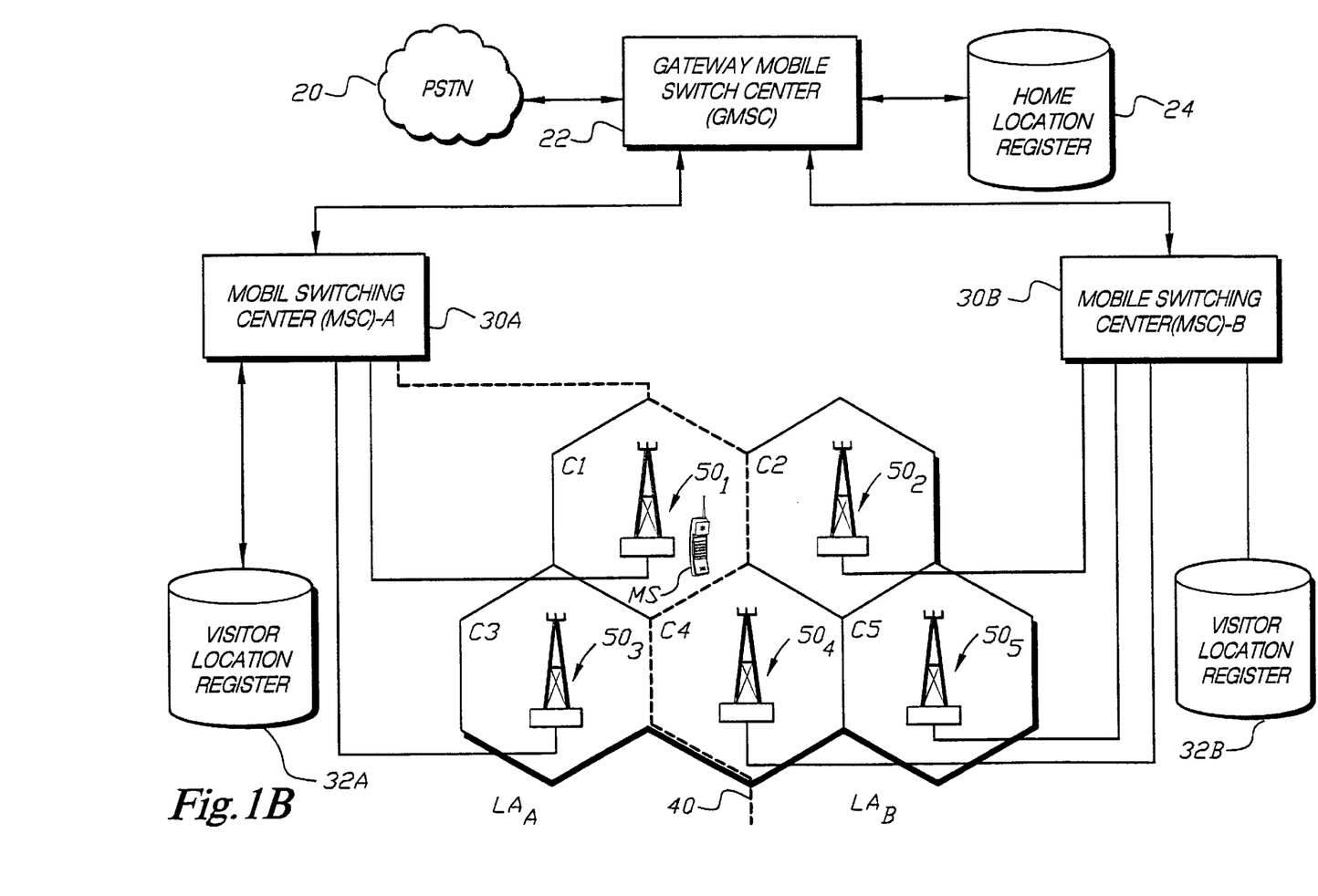
FIG. 1B is a diagrammatic view of a cellular mobile telecommunications system showing a time-dependent geographical restriction imposed in accordance with a second embodiment of the invention.

FIG. 1B depicts a particular embodiment of the invention in which the geographical restriction is time dependent. According to the subscription agreement for the mobile subscriber of FIG. 1B, mobile station MS can be operated in a first set of cells (e.g., cell C1 and C2, as in FIG. 1A) during a first time frame, and in a second set of cells (e.g., cells C1 and C3) during a second time frame. In FIG. 1B, the first set of cells is indicated by horizontal hatching, while the second set of cells is depicted by vertical hatching. Since cell C1 is common to both sets of cells, cell C1 is both horizontally and vertically hatched.

Figure 2B:
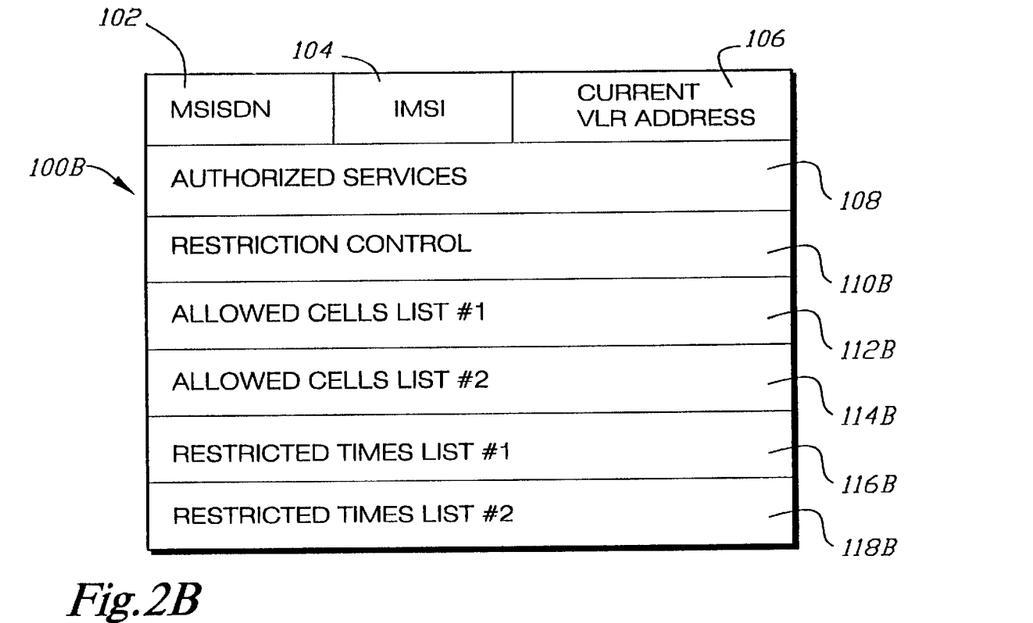
FIG. 2B is a diagrammatic view of a home location register showing contents of a record for a restricted mobile subscriber for the embodiment of FIG. 1B.

FIG. 2B shows a record 100B generally formatted in accordance with the subscription agreement for the mobile subscriber illustrated in FIG. 1B as above discussed. Fields in record 100B which are commonly labeled with those of record 100A are understood to have the same meaning. Record 100B of FIG. 2B differs from record 100A of FIG. 2A e.g., in its restriction control field 110B, and by the provision of the following fields: allowed cells list #1 field 112B; allowed cells list #2 field 114B; restricted times list #1 field 116B; and restricted times list #2 field 118B.

In the scenario of FIG. 1B and FIG. 2B, a flag is set in restriction control field 110B to indicate that operation of mobile station MS is restricted to cells listed in field 112B (the allowed cells list #1) during the times listed in field 116B (the restricted times list #1), and that operation of mobile station MS is restricted to cells listed in field 114B (the allowed cells list #2) during the times listed in field 118B (the restricted times list #2). For example, record 100B may effectively permit mobile station MS to operate only under the following conditions: in cells C1 and C2 during a first time frame (e.g., from 08:00 to 18:00) and in cells C1 and C3 during a second time frame (e.g., from 18:00 to 08:00).

It should be understood that the restricted times lists of record 100B need not be restricted to one time window, e.g., from 08:00 to 18:00, but can instead comprise a series or set of time frames, e.g., from 08:00 to 12:00 and from 13:00 to 18:00, etc. Moreover, the terminology "times" as described with reference to record 100B encompasses the entire calendar, so that days of the week, dates of the month, particular months, etc., can be specified as criteria for operation.

The operation of mobile station MS in the situation depicted in FIG. 1B is understood with reference to the previous discussion of the situation of FIG. 1A. That is, principles of call origination and call receipt as governed by the geographical restriction information stored in the HLR for the mobile subscriber are applicable. The geographical restriction information is transmitted to the pertinent VLR and is checked for allowed cells and restricted times prior either to paging or processing a request to set up a call.

Figure 1C:
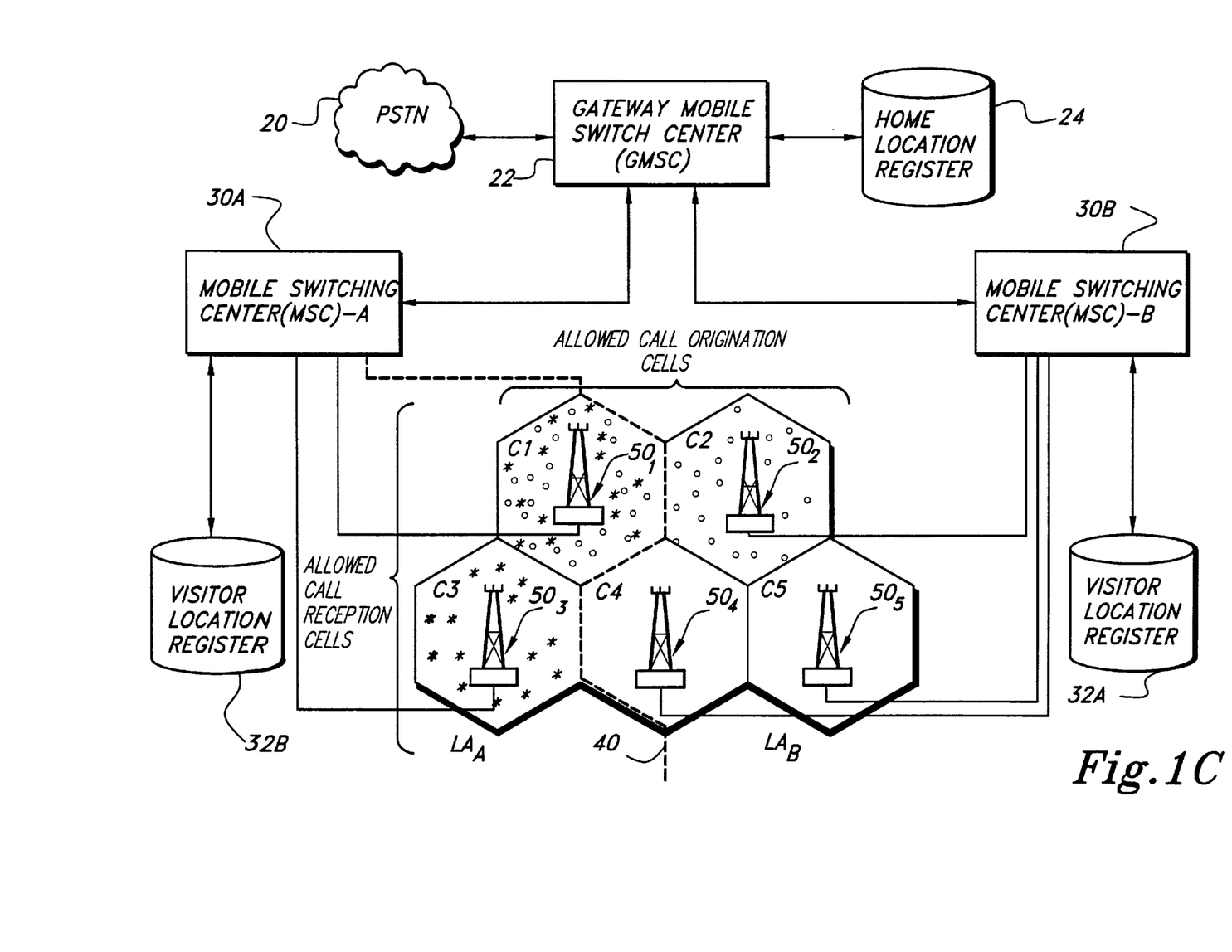
FIG. 1C is a diagrammatic view of a cellular mobile telecommunications system showing a differing geographical restrictions imposed on call origination and call reception in accordance with a third embodiment of the invention.

FIG. 1C depicts a particular embodiment of the invention in which a differing geographical restriction is imposed for call origination and call reception. According to the subscription agreement for the mobile subscriber of FIG. 1C, mobile station MS can originate calls in a first set of cells (e.g., cell C1 and C2, as in FIG. 1A), but can only receive incoming calls while in a second set of cells (e.g., cells C1 and C3). In FIG. 1C, the first set of cells is indicated by dotted stippling, while the second set of cells is depicted by starred stippling. Since cell C1 is common to both sets of cells, cell C1 is both types of stippling.

Figure 2C:
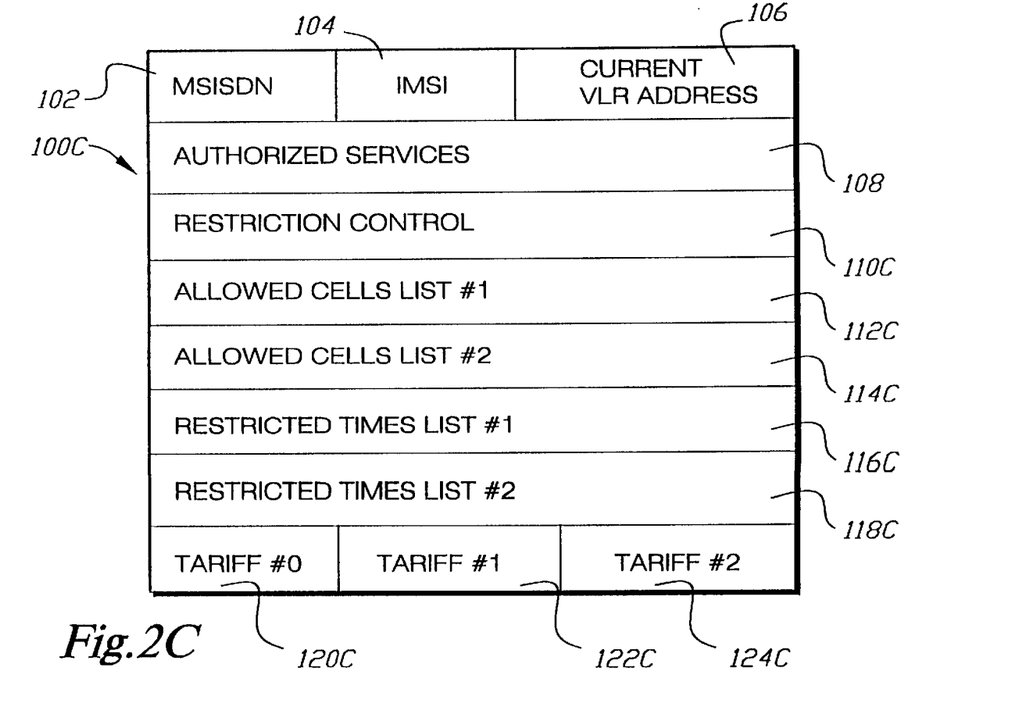
FIG. 2C is a diagrammatic view of a home location register showing contents of a record for a restricted mobile subscriber for the embodiment of FIG. 1C.

FIG. 2C shows a record 100C generally formatted in accordance with the subscription agreement for the mobile subscriber illustrated in FIG. 1C as above discussed. Fields in record 100C which are commonly labeled with those of record 100C are understood to have the same meaning. Record 100C of FIG. 2C differs from record 101A of FIG. 2A e.g., in its restriction control field 110C, and by the provision of the following fields: allowed origination cells list field 112C and allowed reception cells list field 114C. In the example scenario depicted in FIG. 1C, allowed origination cells list field 112C would include cell C1 and cell C2; allowed reception cells list field 114C would include cell C1 and cell C3.

In the scenario of FIG. 1C and FIG. 2C, a flag is set in restriction control field 110C to indicate that calls can only be originated by mobile station MS when mobile station MS is located in the cells listed in allowed origination cells list field 112C, and that calls can be placed to mobile station MS only when mobile station MS is located in the cells listed in allowed reception cells list field 114C.

The operation of mobile station MS in the situation depicted in FIG. 1C is understood with reference to the previous discussion of the situation of FIG. 1A. That is, principles of call origination and call receipt as governed by the geographical restriction information stored in the HLR for the mobile subscriber are applicable. The geographical restriction information is transmitted to the pertinent VLR and is checked for allowed cells prior either to paging or processing a request to set up a call.

Figure 2D:
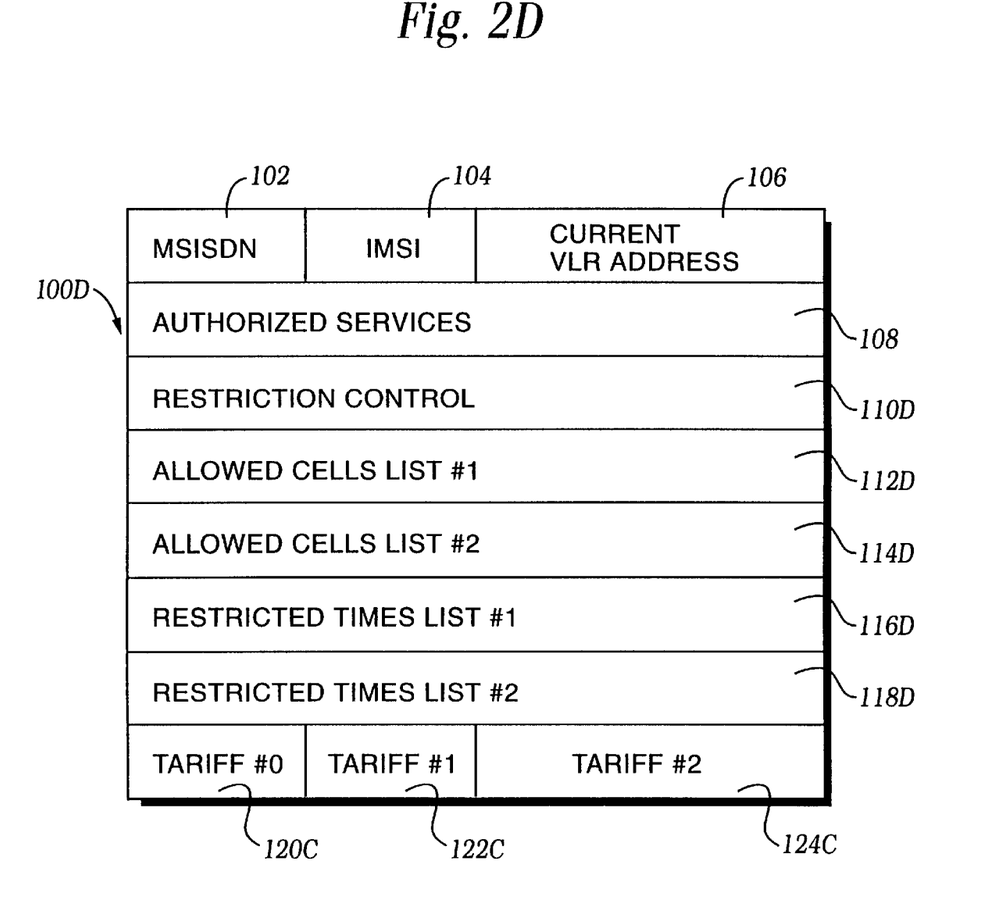
FIG. 2D is a diagrammatic view of a home location register showing contents of a record for a soft restricted mobile subscriber for another embodiment of the invention.

The embodiment of the invention depicted in FIG. 2D resembles that of FIG. 1B and FIG. 2B, but the record 100C of FIG. 2D has stored therein particular tariff rates, as indicated by fields 120D, 122D, and 124D. Moreover, the embodiment of FIG. 2D notably allows the mobile subscriber to use mobile station MS at any time and in any cell at standard tariff rates, but affords the mobile subscriber the more advantageous tariff rates only when mobile station MS is operated in accordance with the geographical restriction and/or restricted time parameters.

A flag set in restriction control field 110D indicates that the mobile subscriber is permitted to use mobile station MS at any time and in any cell at standard tariff rates. The same or another flag in restriction control field 110D indicates that the mobile subscriber is also entitled to lower tariffs when calls are originated or received in the cells specified in one or more of the allowed cells lists (e.g., fields 112D and/or 114D). Permitting the mobile subscriber to originate and receive calls in cells other than those specified in a geographical restriction, and yet affording a tariff differential to calls originated/received in the cells of the geographical restriction, is herein referred to as a "soft" restriction.

Although not necessary for implementation of the soft restriction aspects of the invention, record 100D shows tariff fields 120D, 122D, and 124D wherein are stored tariff #0, tariff #1, and tariff #2, respectively. In accordance with one embodiment of the invention, tariff #0 is the nominal tariff assessed to all calls except those qualifying for the geographical restriction discounted tariff; tariff #1 is the tariff for calls occurring within the set of restrictions imposed by fields 112D and 116D; and, tariff #2 is the tariff for calls occurring within the set of restrictions imposed by fields 114D and 118D.

It should be understood that the "soft" restriction is not limited to the specific situation illustrated in record 100C, but can be applied also to the situations depicted in FIG. 1A, FIG. 1B, and FIG. 1C. That is, for any situation in which a geographical restriction is imposed, the mobile subscriber can with the soft restriction nevertheless originate and receive calls in non-allowed cells, without receiving the tariff discount associated with the geographical restriction.

Another embodiment, known as the semi-soft restriction embodiment, is a variation on the embodiment of FIG. 1A and FIG. 1B. In the embodiment of FIG. 1A and FIG. 1B, a call in progress was terminated when mobile station MS traveled to a non-allowed cell. In the semi-soft restriction embodiment, on the other hand, calls which are originated or received while mobile station MS is in an allowed cell are sustained (i.e., allowed to continue), at either the same or different (e.g., higher) tariff, even when mobile station MS travels into a non-allowed cell. Thus, for handover or handoff of an existing call to a new (non-allowed cell), geographical restrictions are ignored. However, once mobile station MS terminates the call that was occurring during handoff or handover, any subsequent attempts to place a further call or to receive a further call in the non-allowed cell are refused.

Implementation of the semi-soft geographical restriction embodiment is also achieved using subscriber records such as those described above. In this regard, a mobile switching center can be preprogrammed so that all geographical restrictions are one of hard, soft, or semi-soft, or alternatively a value in the subscriber record can indicate the relative "hardness/softness" of the geographical restriction. For example, rather than having a merely flag, restriction control field can have predetermined values, such as (for example) either a "00" indicative of no geographical restriction, a "01" indicative of a hard geographical restriction; a "10" indicative of a soft geographical restriction; and a "11" indicative of a semi-soft geographical restriction.

Moreover, it should be understood that mobile switching centers 30 of the present invention permit origination of calls to predefined emergency numbers (e.g., police department, fire department, etc.) without imposition of geographical restriction.

Figure 3:
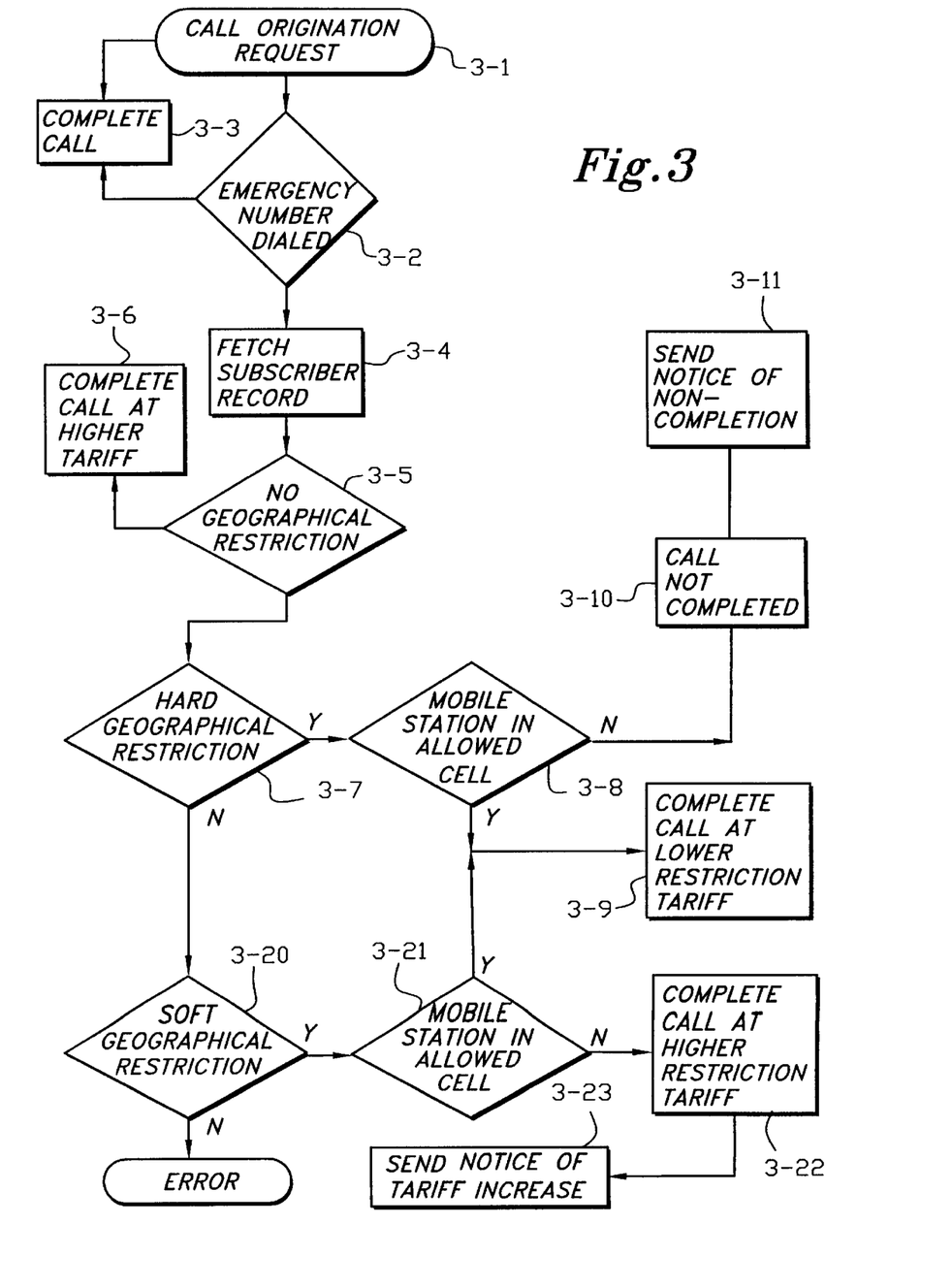
FIG. 3 is a flowchart showing basic steps executed by a mobile switching center, in accordance with selective modes and embodiments of the invention, for handling a call origination request potentially involving geographical

FIG. 3 is a flowchart showing an example of operation of mobile switching center 30 when mobile station MS desires to originate a call. The particular mobile switching center having operation illustrated in FIG. 3 is capable of selectively implementing any of the embodiments and modes above described. It is assumed that the visiting location register (VLR) of mobile switching center 30 has stored therein a subscriber record for the mobile station MS which desires to place the call. Moreover, for providing the relative comprehensive implementation of various embodiments, it is assumed that restriction control field of the subscriber record for the mobile station MS has either a "00" indicative of no geographical restriction, a "01" indicative of a hard geographical restriction; a "10" indicative of a soft geographical restriction; and a "11" indicative of a semi-soft geographical restriction.

Symbol 3-1 represents receipt by mobile switching center 30 of a request by mobile station MS to set up a call and transmission of the dialed number (called number). As indicated by step 3-2, mobile switching center 30 immediately checks to determine whether the dialed number corresponds to an emergency service or other toll-free number. If an emergency service has been dialed, mobile switching center 30 completes the call without reference to any geographical restrictions (see step 3-3).

Assuming that no emergency or other toll-free number is called, at step 3-2 mobile switching center 30 fetches the subscription record (in the manner above described) in its VLR for mobile station MS. Particularly mobile switching center 30 analyzes the restriction control field of the subscription record for mobile station MS, as explained below.

At step 3-5, mobile switching center 30 determines whether the restriction control field indicates that mobile station MS has no geographical restriction (e.g., a "00" value is in the restriction control field). If there is no geographical restriction, at step 3-6 the call is completed at the usual tariff (e.g., higher than the geographically restrictive tariff).

At step 3-7, mobile switching center 30 determines whether the restriction control field indicates that mobile station MS has a "hard" geographical restriction (e.g., a "01" value is in the restriction control field). If so, a check is made at step 3-8 whether mobile station MS is located in an allowed cell at the time the call origination request is made. If mobile station MS is in an allowed cell, the call is completed at the lower tariff in view of the geographical restriction (as indicated by step 3-9). If mobile station MS is in a non-allowed cell and has a hard geographical restriction, the call is not completed (as indicated by step 3-10). When a call is not completed, mobile switching center 30 can optionally transmit to mobile station MS a notification of non-completion (step 3-11). Such notification of non-completion can be received by mobile station as, for example, a pre-recorded audible message transmitted to mobile station or message displayed on a LCD or other type of display device incorporated into mobile station MS.

At step 3-20, mobile switching center 30 determines whether the restriction control field indicates that mobile station MS has a "soft" geographical restriction (e.g., a "10" value is in the restriction control field). If so, a check is made at step 3-21 whether mobile station MS is located in an allowed cell at the time the call origination request is made. If mobile station MS is in an allowed cell, the call is completed at the lower tariff in view of the geographical restriction (as indicated by step 3-9). If mobile station MS is in a non-allowed cell and has a soft geographical restriction, the call is completed at a higher tariff (as indicated by step 3-22). That is, the call is completed at a higher tariff than if the call were originated from a cell that were on the allowed cell list involved in the geographical restriction. When a call is completed at a higher tariff, mobile switching center 30 can optionally transmit to mobile station MS a notification of tariff increase (step 3-23). As with other notifications, the notification of tariff increase can be received by mobile station as, for example, a pre-recorded audible message or a displayed message.

It should be understood that the order of steps 3-22 and 2-23 can be reversed, so that the subscriber at mobile station MS can have the opportunity, after notification of tariff increase, of rescinding the request for call origination.

Figure 4:
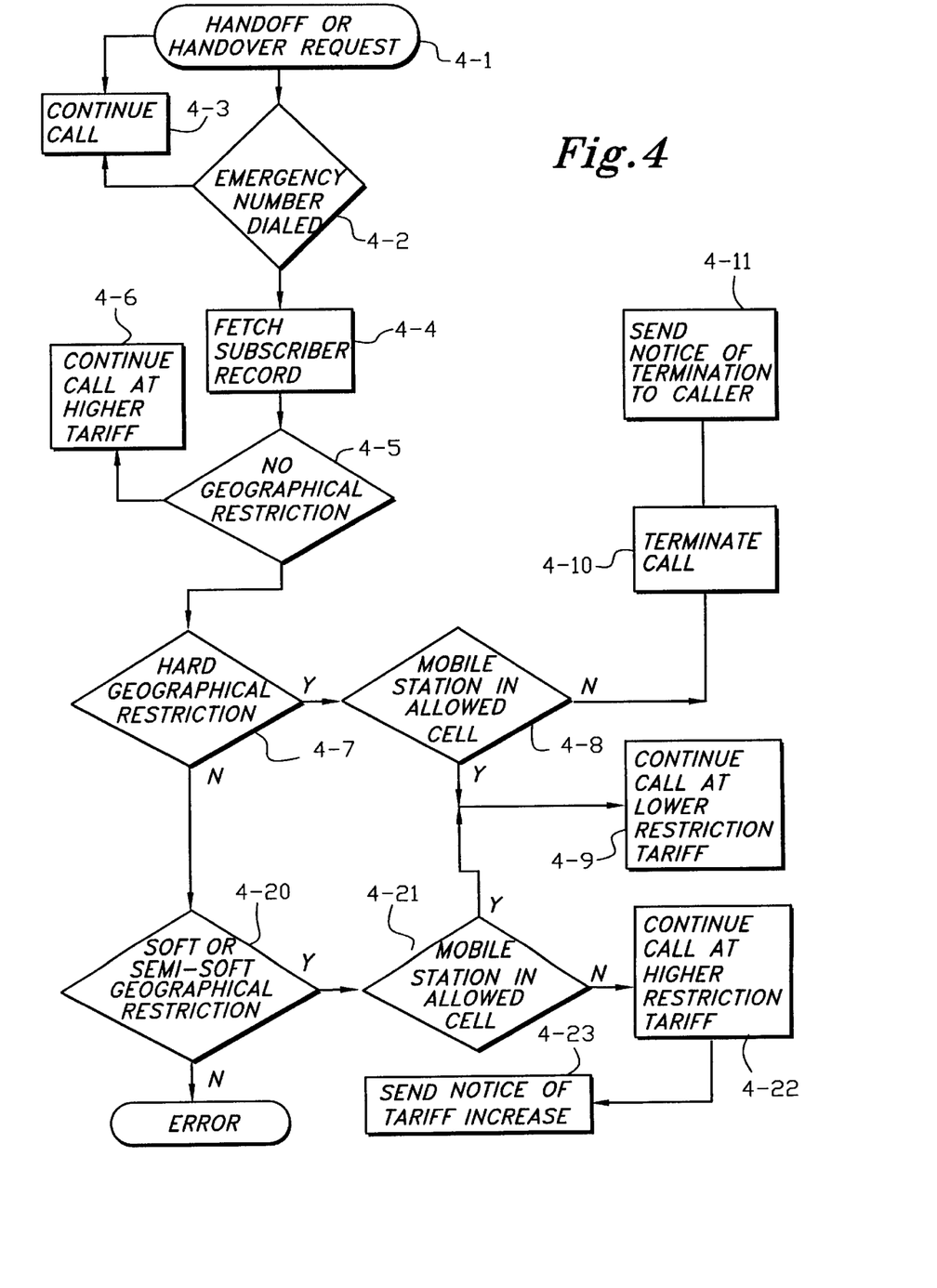
FIG. 4 is a flowchart showing basic steps executed by a mobile switching center, in accordance with selective modes and embodiments of the invention, for handling a call handoff or handover request potentially involving geographical restriction.

FIG. 4 is a flowchart showing an example of operation of mobile switching center 30 when mobile switching center 30 receives a handoff or handover request with respect to mobile station MS. Steps 4-2 through 4-12 of FIG. 4 correspond to steps 3-2 through 3-12 of FIG. 3, respectively, it being understood that in FIG. 4 a call is continued during the handoff/handover rather than originated (as indicated by handoff/handover request symbol 4-1). Accordingly, steps 4-2 through 4-12 are understood from the preceding discussion of FIG. 3. FIG. 4 primarily differs from FIG. 3 with reference to steps 4-20 through 4-23.

At step 4-20, mobile switching center 30 determines whether the restriction control field indicates that mobile station MS has either a "soft" or "semi-soft" geographical restriction (e.g., a "10" value or "11" value is in the restriction control field). If so, a check is made at step 3-21 whether mobile station MS is located in an allowed cell at the time the call origination request is made. If mobile station MS is in an allowed cell, the call is completed at the lower tariff in view of the geographical restriction (as indicated by step 4-9). If mobile station MS is in a non-allowed cell and has a soft or semi-soft geographical restriction, the call is completed at a higher tariff (as indicated by step 3-22) and notification of tariff increase is provided as above described.

It should also be understood that handoff and handover of calls from an allowed cell to a non-allowed cell can, should the operator elect, be at the lower tariff despite the semi-soft or soft geographical restriction. Alternatively, the operator may charge the lower tariff for handoff/handover to a non-allowed cell for a mobile subscriber having a semi-soft geographical restriction, but the higher tariff for handoff/ handover to a non-allowed cell for a mobile subscriber having a soft geographical restriction.

Except primarily for the steps pertaining to emergency and toll-free calls, the steps of FIG. 3 and FIG. 4 are analogously and respectively applicable to reception of a call placed by another party to mobile station MS (FIG. 3) and handoff/handover of a call to mobile station MS which was originated by another party (FIG. 4). It should be understood, however, that in the case of calls originated by another party the notification of step 3-11 is provided to the calling party.

For the embodiments herein described which involve time as well as geographical descriptions, it should be understood that the checks of FIG. 3 and FIG. 4 as to whether a mobile station is in an allowed cell involves, for such embodiments, a determination of allowed cell based on the applicable restricted times in accordance with the subscriber's record.

While the embodiments of FIG. 2B and FIG. 2C have shown two sets of allowed cells and restriction times, it should be understood that more sets can be provided in other embodiments.

Although a very small number of cells and only two mobile switching centers 30 have been illustrated in the drawings, it should be understood that in actuality greater numbers of cells and mobile switching centers are utilized in a mobile telecommunications system. As indicated above, the cells belonging to a geographical restriction list need not necessarily all be served by the same mobile switching center.

The location of home location register (HLR) is not critical to the present invention. Rather, the HLR can be situated in a number of manners, e.g., as part of GMSC 22 or as a distinct node of the network, for example. Moreover, it should be understood that subscriber records 100A, 100B, 100C, and 100D can, and typically do, have additional information not pertinent to the present invention. Further, the ordering of the fields in the records 100A, 100B, 100C, and 100D is not critical to the present invention.

Regular mobile subscribers who do not want geographical restrictions are not affected by the present invention, as indication can be set in those subscriber's records in the HLR (e.g., in the restriction control field) that geographical restrictions are not to apply.

The person skilled in the art understands that GMSC 22, HLR 24, VLRs 32, and the MSCs 30 communicate over lines by messages prepared in accordance with conventional signaling standards.

While the invention has been particularly shown and described with reference to the preferred embodiments thereof, it will be understood by those skilled in the art that various alterations may be made therein without departing from the spirit and scope of the invention.

The embodiments of the invention in which an exclusive property or privilege is claimed are defined as follows:

1. A cellular telecommunications network comprising:
   a mobile station;
   a database maintained at a home location register;
   a mobile switching center having access to the database and being connected to at least one base station serving the mobile station;
   wherein, for the mobile station, the database has stored therein information for geographically restricting operation of the mobile station, the information for geographically restricting operation of the mobile station comprising a list of cells, the cells on the list being included irrespective of network location area; and
   wherein the information for geographically restricting operation of the mobile station is used for determining in what cells the mobile station can be paged and from what cells the mobile station can originate calls; and
   wherein the database is maintained at a home location register and the information for geographically restricting operation of the mobile station is transmitted from the home location register to a visitor location register for the mobile switching center.

2. The cellular telecommunications network of claim 1, wherein the information for geographically restricting operation of the mobile station is used for determining in what cells the mobile station can be paged and from what cells the mobile station can originate calls at a first tariff rate, and wherein the mobile station can be paged and originate calls in other cells at a second tariff rate.

3. The cellular telecommunications network of claim 1, wherein the information for geographically restricting operation of the mobile station includes a list of cells in which the mobile station can originate a call and/or receive a call, and wherein subsequent to establishment of a call the mobile switching center permits handoff or handover of the call to a non-allowed cell not on the list so long as the call was originated or set up while the mobile station was in a cell on the list.

4. A cellular telecommunications network comprising:
   a mobile station;
   a database maintained by a node of the network;
   a mobile switching center having access to the database and being connected to at least one base station serving the mobile station;
   wherein, for the mobile station, the database has stored therein information for geographically restricting operation of the mobile station, the information for geographically restricting operation of the mobile station comprising a list of cells, the cells on the list being included irrespective of network location area; and
   wherein the information for geographically restricting operation of the mobile station is used for determining in what cells the mobile station can be paged and from what cells the mobile station can originate calls; and
   wherein the information for geographically restricting operation of the mobile station includes a first list of cells from which the mobile station can originate a call and a second list of cells in which the mobile station can have a call set up to the mobile station, the second list of cells being different from the first list of cells.

5. A cellular telecommunications network comprising:

a mobile station;

a database maintained by a node of the network;

a mobile switching center having access to the database and being connected to at least one base station serving the mobile station;

wherein, for the mobile station, the database has stored therein information for geographically restricting operation of the mobile station, the information for geographically restricting operation of the mobile station comprising a list of cells, the cells on the list being included irrespective of network location area; and wherein the information for geographically restricting operation of the mobile station is used for determining in what cells the mobile station can be paged and from what cells the mobile station can originate calls; and wherein the information for geographically restricting operation of the mobile station includes a first list of at least a first cell and a second list of at least a second cell, and wherein the first list is utilized for determining in what cells the mobile station can be paged and from what cells the mobile station can originate calls during a first time period and wherein the second list is utilized for determining in what cells the mobile station can be paged and from what cells the mobile station can originate calls during a second time period, the information for geographically restricting operation of the mobile station including both a start time and a stop time for the first time period and the second time period, the start time and stop time being expressed as hours/minutes of a calendar unit.

6. A cellular telecommunications network comprising:

a mobile station;

a home location register;

a mobile switching center having access via signaling to the home location register and being connected to at least one base station serving the mobile station;

a visitor location register connected to the mobile switching center;

wherein, for the mobile station, the home location register has stored therein information for geographically restricting operation of the mobile station, the information for geographically restricting operation of the mobile station comprising a list of cells, the cells on the list being included irrespective of network location area;

wherein, the information for geographically restricting operation of the mobile station is transmitted to the visitor location register when the mobile station is in an area served by the mobile switching center; and wherein the information for geographically restricting operation of the mobile station is used for determining in what cells the mobile station can be paged and from what cells the mobile station can originate calls; and wherein the information for geographically restricting operation of the mobile station includes a first list of cells from which the mobile station can originate a call and a second list of cells in which the mobile station can have a call set up to the mobile station, the second list of cells being different from the first list of cells.

7. The cellular telecommunications network of claim 6, wherein the information for geographically restricting operation of the mobile station is used for determining in what cells the mobile station can be paged and from what cells the mobile station can originate calls at a first tariff rate, and wherein the mobile station can be paged and originate calls in other cells at a second tariff rate.

8. A cellular telecommunications network comprising:

a mobile station;

a home location register;

a mobile switching center having access via signaling to the home location register and being connected to at least one base station serving the mobile station;

a visitor location register connected to the mobile switching center;

wherein, for the mobile station, the home location register has stored therein information for geographically restricting operation of the mobile station, the information for geographically restricting operation of the mobile station comprising a list of cells, the cells on the list being included irrespective of network location area;

wherein, the information for geographically restricting operation of the mobile station is transmitted to the visitor location register when the mobile station is in an area served by the mobile switching center; and wherein the information for geographically restricting operation of the mobile station is used for determining in what cells the mobile station can be paged and from what cells the mobile station can originate calls; and wherein the information for geographically restricting operation of the mobile station includes a first list of at least a first cell and a second list of at least a second cell, and wherein the first list is utilized for determining in what cells the mobile station can be paged and from what cells the mobile station can originate calls during a first time period and wherein the second list is utilized for determining in what cells the mobile station can be paged and from what cells the mobile station can originate calls during a second time period, the information for geographically restricting operation of the mobile station including both a start time and a stop time for the first time period and the second time period, the start time and stop time being expressed as hours/minutes of a calendar unit.

9. A cellular telecommunications network comprising:

a mobile station;

a home location register;

a mobile switching center having access via signaling to the home location register and being connected to at least one base station serving the mobile station;

a visitor location register connected to the mobile switching center;

wherein, for the mobile station, the home location register has stored therein information for geograhically restricting operation of the mobile station, the information for geographically restricting operation of the mobile station comprising a list of cells, the cells on the list being included irrespective of network location area;

wherein, the information for geogaphically restricting operation of the mobile station is transmitted to the visitor location register when the mobile station is in an area served by the mobile switching center; and wherein the information for geographically restricting operation of the mobile station is used for determining in what cells the mobile station can be paged and from what cells the mobile station can originate calls; and wherein the information for geographically restricting operation of the mobile station includes a list of cells in which the mobile station can originate a call and/or receive a call, and wherein subsequent to establishment of a call the mobile switching center permits handoff or handover of the call to a non-allowed cell not on the list so long as the call was originated or set up while the mobile station was in a cell on the list.

10. A cellular telecommunications network comprising:

a mobile station;

a home location register;

a mobile switching center having access via signaling to the home location register and being connected to at least one base station serving the mobile station;

a visitor location register connected to the mobile switching center;

wherein, for the mobile station, the home location register has stored therein information for geographically restricting operation of the mobile station in accordance with a first tariff rate, the information for geographically restricting operation of the mobile station comprising a list of cells, the cells on the list being included irrespective of network location area;

wherein, the information for geographically restricting operation of the mobile station is transmitted to the visitor location register when the mobile station is in an area served by the mobile switching center; and wherein the information for geographically restricting operation of the mobile station is used for determining, in accordance with the first tariff rate, in what cells the mobile station can be paged and from what cells the mobile station can originate calls, the mobile station being paged and originating calls in other cells at a second tariff rate.

11. A cellular telecommunications network comprising:

a mobile station;

a home location register;

a mobile switching center having access via signaling to the home location register and being connected to at least one base station serving the mobile station;

a visitor location register connected to the mobile switching center;

wherein, for the mobile station, the home location register has stored therein information for geographically restricting operation of the mobile station comprising a list of cells, the cells on the list being included irrespective of network location area;

wherein, the information for geographically restricting operation of the mobile station is transmitted to the visitor location register when the mobile station is in an area served by the mobile switching center; and wherein the information for geographically restricting operation of the mobile station is used for determining in in what cells the mobile station can be paged and from what cells the mobile station can originate calls;

wherein the information for geographically restricting operation of the mobile station is used for determining in what cells the mobile station can be paged and from what cells the mobile station can originate calls at a first tariff rate, and wherein the mobile station can be paged and originate calls in other cells at a second tariff rate: and wherein the information restricting operation of the mobile station includes a first list of at least a first cell and a second list of at least a second cell, and wherein the first list is utilized for determining in what cells the mobile station can be paged and from what cells the mobile station can originate calls during a first time period and wherein the second list is utilized for determining in what cells the mobile station can be paged and from what cells the mobile station can originate calls during a second time period, the information for geographically restricting operation of the mobile station including both a start time and a stop time for the first time period, the start time and stop time being expressed as hours/minutes of a calandar unit.

12. A method of connecting a call involving a mobile station in a cellular telecommunications network, the method comprising:

maintaining for the mobile station, in a home location register, information for geographically restricting operation of the mobile station, the information for geographically restricting operation of the mobile station comprising a list of cells, the cells on the list being included irrespective of network location area;

when the mobile station enters an area served by a mobile switching center, transferring the information for geogaphically restricting operation of the mobile station to a visitor location register connected to the mobile switching center;

using the information for geographically restricting operation of the mobile station for determining, in what cells the mobile station can be paged and from what cells the mobile station can originate calls; and wherein the information for geographically restricting operation of the mobile station includes a first list of at least a first cell and a second list of at least a second cell, and wherein the method further comprises:

utilizing the first list for determining in what cells the mobile station can be paged and from what cells the mobile station can originate calls during a first time period; and utilizing the second list for determining in what cells the mobile station can be paged and from what cells the mobile station can originate calls during a second time period;

including in the information for geographically restricting operation of the mobile station including both a start time and a stop time for the first time period and the second time period, the start time and stop time being expressed as hours/minutes of a calendar unit.

13. A method of connecting a call involving a mobile station in a cellular telecommunications network, the method comprising:

maintaining for the mobile station, in a home location register, information for geographically restricting operation of the mobile station, the information for geographically restricting operation of the mobile station comprising a list of cells, the cells on the list being included irrespective of network location area;

when the mobile station enters an area served by a mobile switching center, transferring the information for geographically restricting operation of the mobile station to a visitor location register connected to the mobile switching center;

using the information for geographically restricting operation of the mobile station for determining, in what cells the mobile station can be paged and from what cells the mobile station can originate calls; and wherein the information for geographically restricting operation of the mobile station includes a list of cells in which the mobile station can originate a call and/or receive a call, and wherein subsequent to establishment of a call the mobile switching center permits handoff or handover of the call to a non-allowed cell not on the list so long as the call was originated or set up while the mobile station was in a cell on the list.

14. A cellular telecommunications network comprising:

a mobile station;

a database maintained by a node of the network;

a mobile switching center having access to the database and being connected to at least one base station serving the mobile station;

wherein, for the mobile station, the database has stored therein information for geographically restricting operation of the mobile station; and wherein the information for geographically restricting operation of the mobile station is used for determining in what cells the mobile station can be paged and from what cells the mobile station can originate calls, the information for geographically restricting operation of the mobile station icluding a first list of cells from which the mobile station can originate a call and a second list of cells in which the mobile station can have a call set up to the mobile station, the second list of cells being different from the first list of cells.

15. A method of connecting a call involving a mobile station in a cellular telecommunications network, the method comprising:

maintaining for the mobile station, in a home location register, information for geographically restricting operation of the mobile station;

when the mobile station enters an area served by a mobile switching center, transferring the information for geographically restricting operation of the mobile station to a visitor location register connected to the mobile switching center;

using the information for geographically restricting operation of the mobile station for determining, in what cells the mobile station can be paged and from what cells the mobile station can originate calls;

including in the information for geographically restricting operation of the mobile station a first list of cells from which the mobile station can originate a call and a second list of cells in which the mobile station can have a call set up to the mobile station, the second list of cells being different from the first list of cells.

16. A cellular telecommunications network comprising:

a mobile station;

a database maintained by a node of the network;

a mobile switching center having access to the database and being connected to at least one base station serving the mobile station;

wherein, for the mobile station, the database has stored therein information for geographically restricting operation of the mobile station; and wherein the information for geographically restricting operation of the mobile station includes a first list of at least a first cell and a second list of at least a second cell, and wherein the first list is utilized for determining in what cells the mobile station can be paged and from what cells the mobile station can originate calls during a first time period and wherein the second list is utilized for determining in what cells the mobile station can be paged and from what cells the mobile station can originate calls during a second time period, the information for geographically restricting operation of the mobile station including both a start time and a stop time for the first time period and the second time period, the start time and stop time being expressed as hours/minutes of a calendar unit.

17. A method of connecting a call involving a mobile station in a cellular telecommunications network, the method comprising:

maintaining for the mobile station, in a home location register, information for geographically restricting operation of the mobile station;

when the mobile station enters an area served by a mobile switching center, transferring the information for geographically restricting operation of the mobile station to a visitor location register connected to the mobile switching center;

using the information for geographically restricting operation of the mobile station for determining, in what cells the mobile station can be paged and from what cells the mobile station can originate calls;

including in the information for geographically restricting operation of the mobile station including both a start time and a stop time for a first time period and a second time period, the start time and stop time being expressed as hours/minutes of a calendar unit.

18. A cellular telecommunications network comprising:

a mobile station;

a database maintained by a node of the network;

a mobile switching center having access to the database and being connected to at least one base station serving the mobile station;

wherein, for the mobile station, the database has stored therein information for geographically restricting operation of the mobile station; and wherein the information for geographically restricting operation of the mobile station includes a list of cells in which the mobile station can originate a call and/or receive a call, and wherein subsequent to establishment of a call the mobile switching center permits handoff or handover of the call to a non-allowed cell not on the list so long as the call was originated or set up while the mobile station was in a cell on the list.

19. A method of connecting a call involving a mobile station in a cellular telecommunications network, the method comprising:

maintaining for the mobile station, in a home location register, information for geographically restricting operation of the mobile station;

when the mobile station enters an area served by a mobile switching center, transferring the information for geographically restricting operation of the mobile station to a visitor location register connected to the mobile switching center;

using the information for geographically restricting operation of the mobile station for determining, in what cells the mobile station can be paged and from what cells the mobile station can originate calls;

subsequent to establishment of a call, permitting handoff or handover of the call to a non-allowed cell not on the list so long as the call was originated or set up while the mobile station was in a cell on the list.

* * * * *